(12) United States Patent
Ackerman

(10) Patent No.: US 9,671,228 B2
(45) Date of Patent: Jun. 6, 2017

(54) FLOATING CURRENT MIRROR FOR RLG DISCHARGE CONTROL

(71) Applicant: Honeywell International Inc., Morristown, NJ (US)

(72) Inventor: John F. Ackerman, Mounds View, MN (US)

(73) Assignee: Honeywell International Inc., Morris Plains, NJ (US)

( * ) Notice: Subject to any disclaimer, the term of this patent is extended or adjusted under 35 U.S.C. 154(b) by 310 days.

(21) Appl. No.: 14/520,019

(22) Filed: Oct. 21, 2014

(65) Prior Publication Data

US 2016/0109239 A1     Apr. 21, 2016

(51) Int. Cl.
| | | |
|---|---|---|
| *G01C 19/64* | (2006.01) | |
| *G01C 19/66* | (2006.01) | |
| *H02J 1/00* | (2006.01) | |
| *H01S 3/097* | (2006.01) | |

(52) U.S. Cl.
CPC ......... *G01C 19/665* (2013.01); *G01C 19/661* (2013.01); *H01S 3/09705* (2013.01); *H02J 1/00* (2013.01)

(58) Field of Classification Search
CPC . G01C 19/661; G01C 19/665; H01S 3/09705; H02J 1/00
See application file for complete search history.

(56) References Cited

U.S. PATENT DOCUMENTS

| | | | |
|---|---|---|---|
| 3,390,606 A | | 7/1968 | Podgorski |
| 4,282,495 A | * | 8/1981 | Ljung .................... H01S 3/134 356/459 |
| 4,575,658 A | | 3/1986 | Kay |
| 4,595,293 A | | 6/1986 | Geen |
| 4,606,637 A | | 8/1986 | Geen |
| 5,088,824 A | | 2/1992 | Killpatrick et al. |
| 5,100,235 A | * | 3/1992 | Priddy .................. G01C 19/66 356/459 |

(Continued)

OTHER PUBLICATIONS

European Patent Office, "Extended European Search Report from EP Application No. 15190468.7 mailed Mar. 1, 2016", "from Foreign Counterpart of U.S. Appl. No. 14/520,019", Mar. 1, 2016, pp. 1-6, Published in: EP.

(Continued)

*Primary Examiner* — Michael A Lyons
(74) *Attorney, Agent, or Firm* — Fogg & Powers LLC

(57) ABSTRACT

A ring laser gyroscope (RLG) assembly comprises an RLG block comprising: a first anode; a second anode; a cathode; and a cavity. The RLG assembly further comprises a current supply circuit coupled to the RLG block. The current supply circuit comprises a high voltage power supply to provide a high voltage signal; a first current path coupled between the high voltage power supply and the first anode to provide a first current to the first anode; and a second current path coupled between the high voltage power supply and the second anode to provide a second current to the second anode. The second current path is configured to mirror the first current such that the second current approximately matches the first current. Each component in the second current path is configured to operate based on power derived only from the high voltage signal.

20 Claims, 3 Drawing Sheets

(56) References Cited

U.S. PATENT DOCUMENTS

| | | | | |
|---|---|---|---|---|
| 5,414,727 | A * | 5/1995 | Berndt ................. | G01C 19/661 356/459 |
| 6,208,414 | B1 * | 3/2001 | Killpatrick ............. | G01C 19/66 356/459 |
| 6,965,267 | B2 | 11/2005 | Delorme et al. | |
| 2004/0008351 | A1 * | 1/2004 | Ecklund ............... | G01C 19/661 356/459 |

OTHER PUBLICATIONS

Aronowitz, "Fundamentals of the Ring Laser Gyro", "http://ftp.rta.nato.int/Public/PubFullText/RTO/AG/RTO-AG-339/$AG-339-03.PDF", Apr. 28, 2000, pp. 3-1 thru 3-45, Publisher: NATO Research and Technology Organisation.

European Patent Office, "Communication under Rule 71(3) EPC, from EP Application No. 15190468.7 mailed Jan. 12, 2017", "from Foreign Counterpart of U.S. Appl. No. 14/520,019", Jan. 12, 2017, pp. 1-27, Published in: EP.

\* cited by examiner

FLOATING CURRENT MIRROR FOR RLG DISCHARGE CONTROL

BACKGROUND

Typical Ring Laser Gyroscopes (RLG) have two laser legs that require precise matching of discharge currents for bias stability. In some applications, the cathode of the RLG is maintained near ground potential which results in the two anodes being maintained at several hundred volts above ground. Some conventional circuits utilize voltage level translators, such as opto-electric couplers or transformers, to control the currents at the two anodes.

SUMMARY

In one embodiment, a ring laser gyroscope (RLG) assembly is provided. The RLG assembly comprises an RLG block comprising: a first anode; a second anode; a cathode; and a cavity having a plurality of legs, the cavity being filled with a gas. The gas produces a stimulated emission when a current is induced across at least a portion of the gas. The RLG assembly further comprises a current supply circuit coupled to the RLG block to provide the current to the RLG block. The current supply circuit comprises a high voltage power supply to provide a high voltage signal; a first current path coupled between the high voltage power supply and the first anode to provide a first current to the first anode based on the high voltage signal; and a second current path coupled between the high voltage power supply and the second anode to provide a second current to the second anode based on the high voltage signal. The second current path is configured to mirror the first current such that the second current approximately matches the first current. Each component in the second current path is configured to operate based on power derived only from the high voltage signal used to provide current to the first and second anodes of the RLG block.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
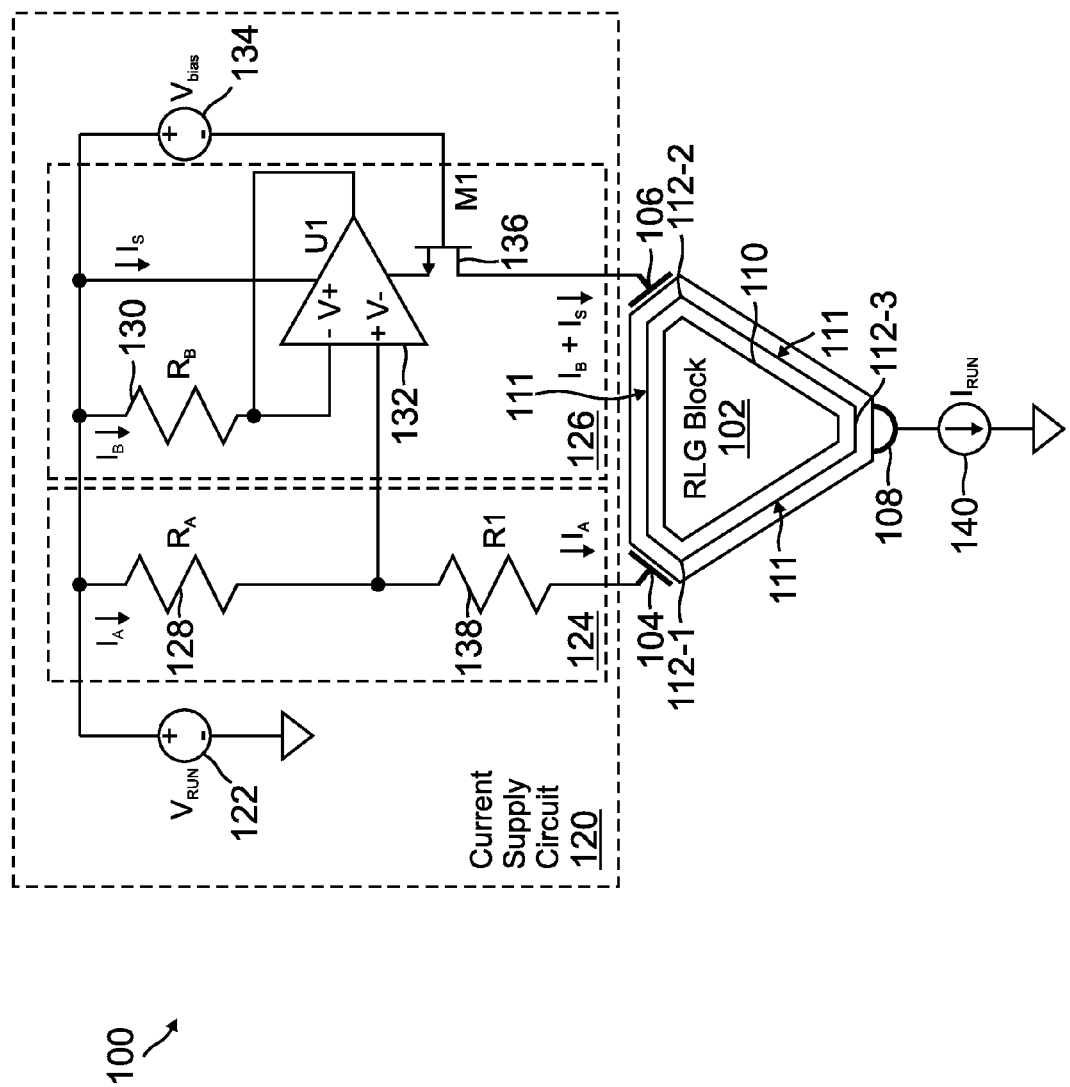
FIG. 1 is a diagram depicting one embodiment of an exemplary ring laser gyroscope (RLG) assembly.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a diagram depicting one embodiment of an exemplary ring laser gyroscope (RLG) assembly 100. The RLG assembly 100 includes an RLG block 102 having a first anode 104, a second anode 106, and a cathode 108. In addition, the RLG block 102 includes a cavity 110 having a plurality of legs 111. For example, as understood by one of skill in the art, the cavity 110 can be formed by machining the block 102. The cavity 110 contains a gas, such as a Helium-Neon (HeNe) gas mixture. However, any gas or gas mixture capable of producing monochromatic laser beams could be used. At least a portion of the gas within the cavity 110 is converted to a gain medium by applying a current through the portion of the gas, as known by one of skill in the art. In particular, the helium and neon atoms are excited by inducing a current across a portion of the gas mixture. The excited helium atoms collide with the excited neon atoms which produces fluorescence and stimulated emission.

Thus, the gain medium produces and subsequently amplifies light that propagates in both the clockwise (CW) and counter-clockwise (CCW) directions through the cavity 110 of the gyroscope block 102 along a path defined in the cavity between mirror 112-1, mirror 112-2, and mirror 112-3. The light propagating through the cavity 110 of the gyroscope block 102 constructively interferes with itself to create two counter rotating beams, one traveling in the CW direction and the other traveling in the CCW direction, both with a wavelength of approximately 633 nanometers, in this example, while the gyroscope assembly 100 is stationary. These beams are also sometimes referred to by other names, such as laser fields, light fields, or laser beams. Light from both of the beams is tapped off through one or more of the mirrors and the light from the CW beam is interfered with light from the CCW beam to determine the frequency difference between the CW and CCW beams. To avoid confusion in the drawings, the structure for tapping and interfering the two laser beams is not shown. The tapping-off of the laser beams occurs pursuant to established procedures.

To provide the current, the RLG assembly 100 also includes a current supply circuit 120. The current supply circuit 120 includes a power supply 122, a first current path 124, a second current path 126, and a low voltage source 134. In this embodiment, it is desirable for the voltage at the cathode 108 to be near ground. As a result, the voltage at the anodes 104 and 106 will be a high voltage, such as on the order of 400-1000 volts above ground for example. As used herein, the term high voltage refers to a voltage equal to or greater than approximately 300 volts. Hence, the power supply 122 is a high-voltage supply. The current supply circuit 120 maintains equal currents into the anodes 104 and 106 and operates at high voltage without the need for a separate power supply or an interface to low-voltage circuits or translators.

The voltage supplied by the power supply 122 is provided to each of the first current path 124 and the second current path 126. The first current path 124 includes a sense resistor 128 (also labelled Ra) and the second current path 126 includes a sense resistor 130 (also labelled Rb). The sense resistor 128 is used to sense the current Ia through the first current path 124. The sense resistor 130 is used to sense the current Ib through the second current path 126. The sense resistors 128 and 130 are matched resistors having approximately the same properties (e.g. resistive value) which means that the current Ia is similar in value to the current Ib.

However, to improve performance of the RLG assembly, it is desirable to match the currents Ia and Ib to a greater degree than is achieved by using matched resistors 128 and 130 alone. For example, using only matched resistors can have a variance between the currents Ia and Ib on the order of a few to tens of volts. Thus, the second current path 126 includes circuitry to more closely match the currents Ia and Ib.

In particular, one end of the sense resistor 128 is coupled to an input of an operational amplifier 132 (also labelled U1) in the second current path 126. Similarly, one end of the sense resistor 130 is coupled to another input of the operational amplifier 132. In this example, the sense resistor 128 is coupled to the positive input of the operational amplifier 132 and the sense resistor 130 is coupled to the negative input. Additionally, an output of the operational amplifier 132 is coupled to the negative input to provide negative feedback.

The operational amplifier 132 adjusts the current Ib based on the negative feedback until the current Ib equals the current Ia within some predefined tolerance level. For example, the currents Ib and Ia can be equal to within 0.01 amps, 0.0001 amps, etc. It is to be understood that the specific tolerance level can vary based on the specific embodiment. The operational amplifier 132 is a self-powered operational amplifier. As used herein, the term self-powered means that the operational amplifier does not require a separate external power supply. Instead, the operational amplifier 132 is powered through the discharge current. Hence, each component in the second current path is configured to operate based on power derived only from the high voltage signal used to provide current to the first and second anodes of the RLG block, as further discussed below. This allows the current mirror in the second current path to float at the discharge voltage without requiring an interface to low-voltage circuits. The power for the operational amplifier is kept low by returning the low current Is directly into the discharge current. One exemplary low current self-powered operational amplifier which can be used in some embodiments is the LT1494 operational amplifier produced by Linear Technology.

The low voltage source 134 (also labelled Vbias) and an insulated-gate field effect transistor (IGFET) 136 are coupled to the operational amplifier 132 to limit the voltage potential across voltage supply terminals (V+ and V−) of the operational amplifier 132. In particular, the source of the IGFET is coupled to the V− terminal and the drain of the IGFET is coupled to the second anode. The gate of the IGFET is coupled to an output of the low voltage source 134. The specific value of the voltage potential is dependent on the implementation of the operational amplifier 132. For example, in some embodiments, the voltage potential is on the order of 10-15 volts. The low voltage source 134 is coupled to the high voltage power supply 122 and outputs a low voltage power signal based on the input signal received from the high voltage power supply 122. The specific voltage level output by the low voltage source 134 is dependent on the implementation of the operational amplifier 132. For example, in one embodiment, the voltage level output by the low voltage source 134 is approximately 10 volts.

The low voltage signal is applied to the gate of the IGFET 136 such that the voltage potential between the source and the gate of the IGFET 136 is on the order of a few volts. In this way, the supply current, Is, through the operational amplifier 132 is negligible (e.g. on the order of 1 microamp (μA) or less). In particular, in this example, the Is current is approximately 0.5 μA. Additionally, the voltage across the drain of IGFET 136 will vary to accommodate a mismatch in voltage potentials across the first current path 124 and the second current path 126. The resistor 138 (also labelled R1) is used to set a nominal control range for the IGFET 136. For example, for purposes of explanation, assume the voltage potential across the first current path 124 is 500 volts and the voltage potential across the second current path 126 is 500 volt±10 volts. Thus, there is a differential current due to the difference in voltage potential. The value of the resistor 138 can be selected to set the nominal control range at approximately 20 volts. The voltage potential across the IGFET 136 is then set to the midpoint of the ±10 volts so that it give a control range to match the currents.

Thus, the current at the drain of the IGFET 136 is equal to Ib plus Is. Since the operational amplifier 132 sets the current Ib equal to the current Ia and the Is current is negligible, the current supplied to anode 104 via the first current path 124 is equal to the current supplied to anode 106 via the second current path 126 to within a predetermined tolerance level. Coupled to the cathode 108 is a total current control circuit 140 which is configured to control the total current, Irun, in the RLG block 102, as described in more detail below with respect to FIG. 2.

Figure 2:
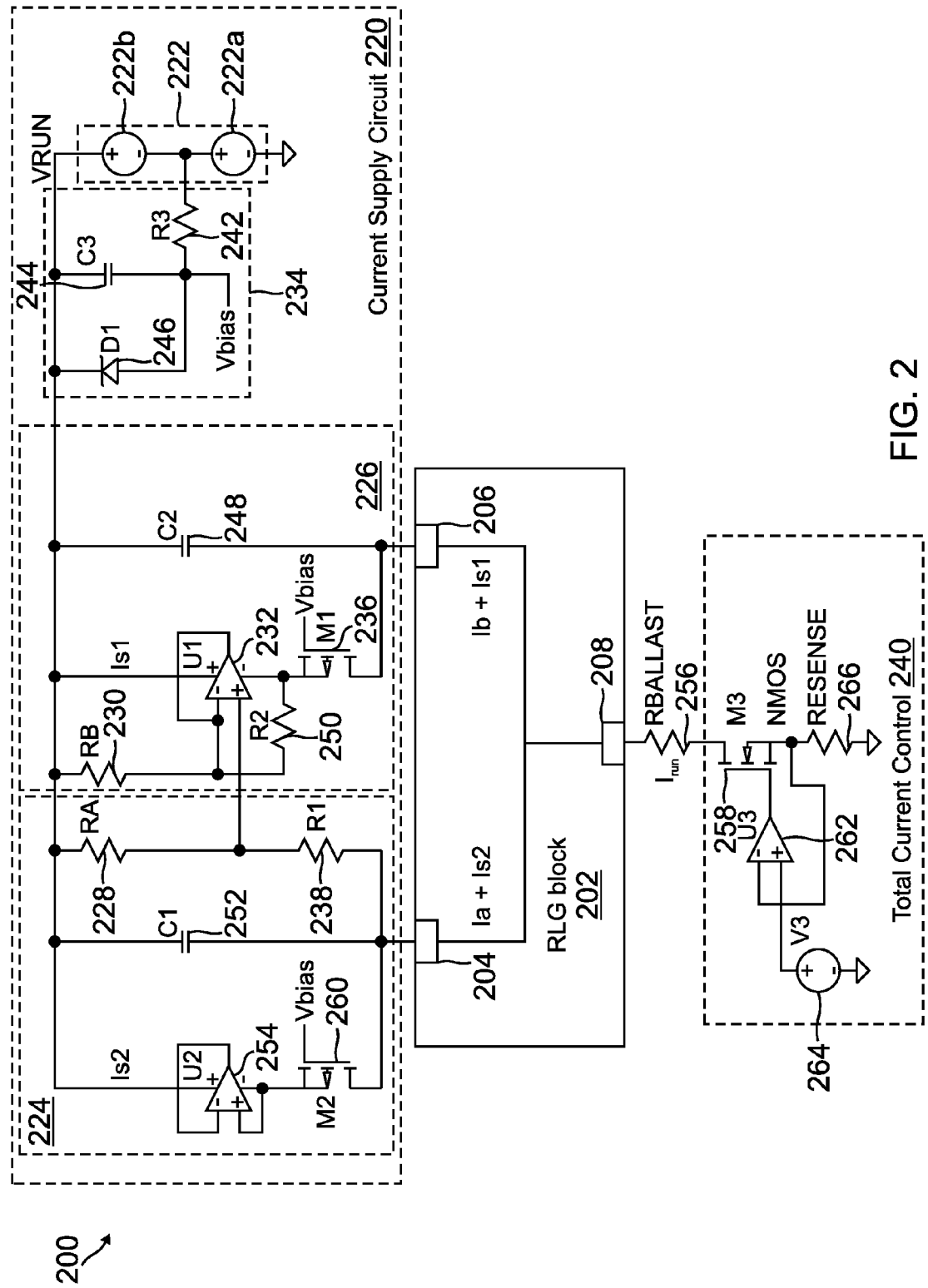
FIG. 2 is a circuit diagram of another embodiment of an exemplary RLG assembly.

FIG. 2 is a circuit diagram of another embodiment of an exemplary RLG assembly 200. Similar to RLG assembly 100, the RLG assembly 200 includes an RLG block 202 having a first anode 204, a second anode 206, and a cathode 208. Additionally, the RLG assembly 200 includes a current supply circuit 220 and a total current control circuit 240. The current supply circuit 220 includes a first current path 224 and a second current path 226 similar to the current supply circuit 120 of FIG. 1. It is to be understood that the current supply circuit 220 includes components similar to those described above with respect to FIG. 1. Such components are labelled similarly to the corresponding component in FIG. 1 and not described in more detail with respect to FIG. 2 where the function or operation of the component has been described above. For example, the sense resistors 228 and 230 have an exemplary value of 10 kiloohms (kΩ) in this embodiments. However, the sense resistors 228 and 230 been described above and are not discussed in more detail below. Similarly, resistor 238 has an exemplary value of 100 kΩ in this example. However, since resistor 238 is similar to resistor 138 discussed above, resistor 238 is not described in more detail with respect to FIG. 2.

As can be seen in the example of FIG. 2, the high voltage power supply 222 is comprised of two power supplies 222a and 222b coupled in series. In this example, the power supply 222a is a 400 volt power supply and the power supply 222b is a 200 volt power supply. It is to be understood that the specific values for various components described herein are provided by way of example only and that the specific values will vary based on the specific implementation.

The low voltage source 234 is coupled across the power supply 222b. The low voltage source 234 comprises a resistor 242 (also labelled R3), a capacitor 244 (also labelled C3), and a diode 246 (also labelled D1). The diode 246 provides the low voltage Vbias and the current through the diode 246 is set by the resistor 242. The capacitor 244 acts as a filter. Thus, the low voltage source 234 is configured to output a low voltage Vbias based on the input voltage from the high voltage power supply 222 while not dissipating a relatively significant amount of power. In this exemplary embodiment, the diode 246 is a zener diode, the capacitor 244 has a capacitance of 0.001 microfarads (μF), and the resistor 242 has a value of 2 megaohms (MΩ). However, it is to be understood that other values and types of elements can be used in other embodiments. For example, although a zener diode is used in this embodiment, other types of linear regulators can be used in other embodiments.

The second current path 226 is similar to the second current path 126 discussed above. However, the second current path 226 also includes an optional capacitor 248 (also labelled C2) used to filter the current provided to the second anode 206. In this exemplary embodiment, the capacitor 248 has a capacitance of 0.001 µF. However, it is to be understood that other values can be used in other embodiments. In addition, the second current path 226 includes an optional resistor 250 (also labelled R2) coupled between the sense resistor 230 and the IGFET 236. In particular, one end of the resistor 250 is coupled to the second end of the sense resistor 230 and the second end of the resistor 250 is coupled to the source of the IGFET 236. The resistor 250 is used to boost the current through the second current path 226 beyond the capability of the operation amplifier 232. In this exemplary embodiments, the resistor 250 has a value of 25 kΩ. However, it is to be understood that other values can be used in other embodiments.

The first current path 224 is similar to the first current path 124 discussed above. However, the first current path 224 also includes an optional capacitor 252 (also labelled C1) which is used to filter the current provided to the first anode 204. In this exemplary embodiment, the capacitor 252 has a capacitance of 0.001 µF. However, it is to be understood that other values can be used in other embodiments. The first current path 224 also includes an optional self-powered second operational amplifier 254 (also labelled U2) and an optional second IGFET 260. The operational amplifier 254 is similar to the self-powered operational amplifier 232 and the second IGFET is similar to the IGFET 236. As stated above, the operational amplifier 232 introduces a small current (e.g. on the order of 1 µA) which is typically negligible. However, in some embodiments, the second operational amplifier 254 and IGFET 260 are included to compensate for the additional current from the operational amplifier 232 by introducing a similar current into the current provided to the anode 204.

FIG. 2 also depicts exemplary components for the total current control circuit 240. A ballast resistor 256 (also labeled Rballast) is coupled between the cathode 208 and the total current control circuit 240. The ballast resistor 256 prevents current oscillations at the cathode 208. In this exemplary embodiment, the ballast resistor 256 has a value of 100 kΩ. However, it is to be understood that other values can be used in other embodiments. The total current control circuit 240 includes an IGFET 258 (also labelled M3), an operational amplifier 262 (also labelled U3), a low voltage power supply 264 (e.g. 1 volt) and a resistor 266. The operational amplifier 262 is coupled between the IGFET 258 and the low voltage power supply 264 as shown in FIG. 2. The resistor 266 is coupled between ground and the drain of the IGFET 258 and has an exemplary value of 1 kΩ in this embodiment. The components of the total current control circuit 240 operate to maintain the total current through the legs of the RLG block 202 at a predetermined level, such as at 1 milliamp for example, as understood by one of skill in the art.

Figure 3:
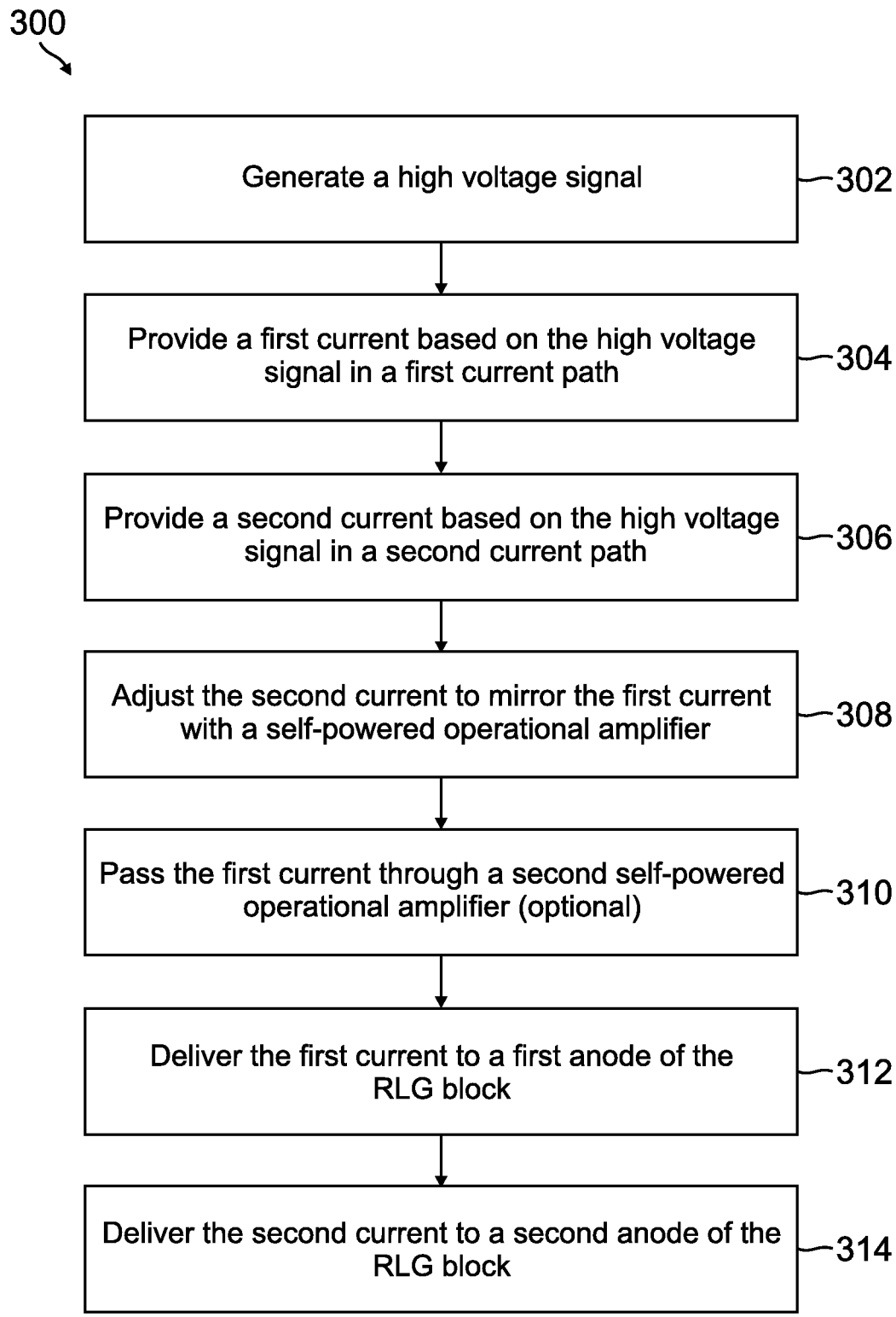
FIG. 3 is a flow chart depicting one embodiment of an exemplary method of balancing current through two legs of an RLG block.

FIG. 3 is a flow chart depicting one embodiment of an exemplary method 300 of balancing current through two legs of a ring laser gyroscope (RLG) block. It is to be understood that nothing in the discussion of method 300 should be construed as limiting the order in which individual steps may be performed. At block 302, a high voltage signal is generated, such as with the high voltage power supply 122 discussed above. At block 304, a first current based on the high voltage signal is provided in a first current path. In some embodiments, providing the first current includes filtering the first current, such as with a capacitor as described above. At block 306, a second current based on the high voltage signal is provided in a second current path. In some embodiments, providing the second current includes filtering the second current, such as with a capacitor as described above. In addition, in some embodiments, providing the second current includes boosting the second current, such as with resistor 250 discussed above.

At block 308, the second current is adjusted to mirror the first current. The second current is adjusted with a self-powered operational amplifier in the second current path. The self-powered operational amplifier, such as operational amplifier 132, is configured to operate based on power derived only from the high voltage signal used to provide the first current and the second current. In addition, adjusting the second current can also include limiting the voltage potential across voltage supply terminals of the self-powered operational amplifier, such as with an IGFET and low voltage source as discussed above.

At block 310, the first current is optionally passed through a second self-powered operational amplifier, such as operational amplifier 254 discussed above. The second self-powered operational amplifier is configured to introduce a current (e.g. Is2 discussed above) into the first current path that is approximately equal to a current (e.g. Is1 discussed above) introduced into the second current path by the self-powered operational amplifier in the second current path. At block 312, the first current is delivered to a first anode of the RLG block. At block 314, the second current is delivered to the second anode of the RLG block.

Thus, the embodiments described herein enable the use of a self-powered operational amplifier so that the currents can be matched without the need for an additional power supply. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a ring laser gyroscope (RLG) assembly comprising: an RLG block comprising: a first anode; a second anode; a cathode; and a cavity having a plurality of legs, the cavity being filled with a gas, wherein the gas produces a stimulated emission when a current is induced across at least a portion of the gas; the RLG assembly further comprising a current supply circuit coupled to the RLG block to provide the current to the RLG block, wherein the current supply circuit comprises: a high voltage power supply to provide a high voltage signal; a first current path coupled between the high voltage power supply and the first anode to provide a first current to the first anode based on the high voltage signal; and a second current path coupled between the high voltage power supply and the second anode to provide a second current to the second anode based on the high voltage signal, the second current path configured to mirror the first current such that the second current approximately matches the first current; wherein each component in the second current path is configured to operate based on power derived only from the high voltage signal used to provide current to the first and second anodes of the RLG block.

Example 2 includes the RLG assembly of Example 1, wherein the first current path comprises: a first resistor having a first end coupled to an output of the high voltage power supply; and a second resistor having a first end coupled to a second end of the first resistor and a second end coupled to the first anode; wherein the second current path comprises: a third resistor having a first end coupled to an output of the high voltage power supply; a self-powered operational amplifier having a positive input and a negative input, the positive input coupled to the second end of the first resistor and the negative input coupled to a second end of the third resistor, wherein an output of the self-powered operational amplifier is coupled to the negative input to provide negative feedback; and an insulated gate field effect transistor (IGFET) having a source coupled to a terminal of the self-powered operational amplifier and a drain coupled to the second anode.

Example 3 includes the RLG assembly of Example 2, wherein the first current path further comprises: a second self-powered operational amplifier; and a second IGFET having a source coupled to a terminal of the second self-powered operational amplifier and a drain coupled to the first anode; wherein the second self-powered operational amplifier is configured to introduce a current into the first current path that is approximately equal to a current introduced into the second current path by the self-powered operational amplifier in the second current path.

Example 4 includes the RLG assembly of any of Examples 2-3, wherein the first current path and the second current path each further comprise a capacitor configured to filter a respective current signal applied to the first anode and second anodes, respectively.

Example 5 includes the RLG assembly of any of Examples 2-4, wherein the second current path further comprises a fourth resistor having a first end coupled to the second end of the third resistor and a second end coupled to the source of the IGFET in the second current path.

Example 6 includes the RLG assembly of any of Examples 2-5, wherein the current supply circuit further comprises a low voltage source coupled to the high voltage power supply, the low voltage source configured to provide a low voltage signal to a gate of the IGFET in the second current path; wherein the low voltage signal is derived from the high voltage signal provided by the high voltage power supply.

Example 7 includes the RLG assembly of Example 6, wherein the low voltage source includes a zener diode.

Example 8 includes the RLG assembly of any of Examples 1-7, further comprising a total current control circuit coupled to the cathode of the RLG block, the total current control circuit configured to control the total current through the RLG block.

Example 9 includes a current supply circuit for a ring laser gyroscope (RLG) assembly, the current supply circuit comprising: a high voltage power supply to provide a high voltage signal; a first current path coupled between the high voltage power supply and a first anode of an RLG block in the RLG assembly to provide a first current based on the high voltage signal to the first anode; and a second current path coupled between the high voltage power supply and a second anode of the RLG block to provide a second current based on the high voltage signal to the second anode, the second current path configured to mirror the first current such that the second current approximately matches the first current; wherein each component in the second current path is configured to operate based on power derived only from the high voltage signal used to provide current to the first and second anodes of the RLG block.

Example 10 includes the current supply circuit of Example 9, wherein the first current path comprises: a first resistor having a first end coupled to an output of the high voltage power supply; and a second resistor having a first end coupled to a second end of the first resistor and a second end coupled to the first anode; wherein the second current path comprises: a third resistor having a first end coupled to an output of the high voltage power supply; a self-powered operational amplifier having a positive input and a negative input, the positive input coupled to the second end of the first resistor and the negative input coupled to a second end of the third resistor, wherein an output of the self-powered operational amplifier is coupled to the negative input to provide negative feedback; and an insulated gate field effect transistor (IGFET) having a source coupled to a terminal of the self-powered operational amplifier and a drain coupled to the second anode.

Example 11 includes the current supply circuit of Example 10, wherein the first current path further comprises: a second self-powered operational amplifier; and a second IGFET having a source coupled to a terminal of the second self-powered operational amplifier and a drain coupled to the first anode; wherein the second self-powered operational amplifier is configured to introduce a current into the first current path that is approximately equal to a current introduced into the second current path by the self-powered operational amplifier in the second current path.

Example 12 includes the current supply circuit of any of Examples 10-11, wherein the first current path and the second current path each further comprise a capacitor configured to filter a respective current signal applied to the first anode and second anodes, respectively.

Example 13 includes the current supply circuit of any of Examples 10-12, wherein the second current path further comprises a fourth resistor having a first end coupled to the second end of the third resistor and a second end coupled to the source of the IGFET in the second current path.

Example 14 includes the current supply circuit of any of Examples 10-13, wherein the current supply circuit further comprises a low voltage source coupled to the high voltage power supply, the low voltage source configured to provide a low voltage signal to a gate of the IGFET in the second current path; wherein the low voltage signal is derived from the high voltage signal provided by the high voltage power supply.

Example 15 includes the current supply circuit of Example 14, wherein the low voltage source includes a zener diode.

Example 16 includes a method of balancing current through two legs of a ring laser gyroscope (RLG) block, the method comprising: generating a high voltage signal; providing a first current based on the high voltage signal in a first current path; providing a second current based on the high voltage signal in a second current path; adjusting the second current to mirror the first current with a self-powered operational amplifier in the second current path that is configured to operate based on power derived only from the high voltage signal used to provide the first current and the second current; delivering the first current to a first anode of the RLG block; and delivering the adjusted second current to a second anode of the RLG block.

Example 17 includes the method of Example 16, wherein providing the first current further comprises filtering the first current prior to delivering the first current to the first anode; and wherein providing the second current further comprises filtering the second current prior to delivering the second current to the second anode.

Example 18 includes the method of any of Examples 16-17, further comprising passing the first current through a second self-powered operational amplifier to introduce a current into the first current path that is approximately equal to a current introduced into the second current path by the self-powered operational amplifier in the second current path.

Example 19 includes the method of any of Examples 16-18, wherein providing the second current further comprises boosting the second current in the second current path.

Example 20 includes the method of any of Examples 16-19, wherein adjusting the second current further comprises: limiting a voltage potential across voltage supply terminals of the operational amplifier with an insulated-gate field effect transistor having a source coupled to one of the voltage supply terminals and a gate coupled to a low voltage source.

What is claimed is:

1. A ring laser gyroscope (RLG) assembly comprising:
   an RLG block comprising:
      a first anode;
      a second anode;
      a cathode; and
      a cavity having a plurality of legs, the cavity being filled with a gas, wherein the gas produces a stimulated emission when a current is induced across at least a portion of the gas;
   the RLG assembly further comprising a current supply circuit coupled to the RLG block to provide the current to the RLG block, wherein the current supply circuit comprises:
      a high voltage power supply to provide a high voltage signal;
      a first current path coupled between the high voltage power supply and the first anode to provide a first current to the first anode based on the high voltage signal; and
      a second current path coupled between the high voltage power supply and the second anode to provide a second current to the second anode based on the high voltage signal, the second current path configured to mirror the first current such that the second current approximately matches the first current, the second current path further comprising a self-powered operational amplifier that is configured to adjust the second current to mirror the first current, wherein the self-powered operational amplifier is further configured to operate based on power derived only from the high voltage signal used to provide the first current and the second current;
      wherein each component in the second current path is configured to operate based on power derived only from the high voltage signal used to provide current to the first and second anodes of the RLG block.

2. The RLG assembly of claim 1, wherein the first current path comprises:
   a first resistor having a first end coupled to an output of the high voltage power supply; and
   a second resistor having a first end coupled to a second end of the first resistor and a second end coupled to the first anode;
wherein the second current path comprises:
   a third resistor having a first end coupled to an output of the high voltage power supply;
   wherein the self-powered operational amplifier includes a positive input and a negative input, the positive input coupled to the second end of the first resistor and the negative input coupled to a second end of the third resistor, wherein an output of the self-powered operational amplifier is coupled to the negative input to provide negative feedback; and
   an insulated gate field effect transistor (IGFET) having a source coupled to a terminal of the self-powered operational amplifier and a drain coupled to the second anode.

3. The RLG assembly of claim 2, wherein the first current path further comprises:
   a second self-powered operational amplifier; and
   a second IGFET having a source coupled to a terminal of the second self-powered operational amplifier and a drain coupled to the first anode;
   wherein the second self-powered operational amplifier is configured to introduce a current into the first current path that is approximately equal to a current introduced into the second current path by the self-powered operational amplifier in the second current path.

4. The RLG assembly of claim 2, wherein the first current path and the second current path each further comprise a capacitor configured to filter a respective current signal applied to the first anode and second anodes, respectively.

5. The RLG assembly of claim 2, wherein the second current path further comprises a fourth resistor having a first end coupled to the second end of the third resistor and a second end coupled to the source of the IGFET in the second current path.

6. The RLG assembly of claim 2, wherein the current supply circuit further comprises a low voltage source coupled to the high voltage power supply, the low voltage source configured to provide a low voltage signal to a gate of the IGFET in the second current path; wherein the low voltage signal is derived from the high voltage signal provided by the high voltage power supply.

7. The RLG assembly of claim 6, wherein the low voltage source includes a zener diode.

8. The RLG assembly of claim 1, further comprising a total current control circuit coupled to the cathode of the RLG block, the total current control circuit configured to control the total current through the RLG block.

9. A current supply circuit for a ring laser gyroscope (RLG) assembly, the current supply circuit comprising:
   a high voltage power supply to provide a high voltage signal;
   a first current path coupled between the high voltage power supply and a first anode of an RLG block in the RLG assembly to provide a first current based on the high voltage signal to the first anode; and
   a second current path coupled between the high voltage power supply and a second anode of the RLG block to provide a second current based on the high voltage signal to the second anode, the second current path configured to mirror the first current such that the second current approximately matches the first current, the second current path further comprising a self-powered operational amplifier that is configured to adjust the second current to mirror the first current, wherein the self-powered operational amplifier is further configured to operate based on power derived only from the high voltage signal used to provide the first current and the second current;

wherein each component in the second current path is configured to operate based on power derived only from the high voltage signal used to provide current to the first and second anodes of the RLG block.

10. The current supply circuit of claim 9, wherein the first current path comprises:
   a first resistor having a first end coupled to an output of the high voltage power supply; and
   a second resistor having a first end coupled to a second end of the first resistor and a second end coupled to the first anode;
wherein the second current path comprises:
   a third resistor having a first end coupled to an output of the high voltage power supply;
   wherein the self-powered operational amplifier includes a positive input and a negative input, the positive input coupled to the second end of the first resistor and the negative input coupled to a second end of the third resistor, wherein an output of the self-powered operational amplifier is coupled to the negative input to provide negative feedback; and
   an insulated gate field effect transistor (IGFET) having a source coupled to a terminal of the self-powered operational amplifier and a drain coupled to the second anode.

11. The current supply circuit of claim 10, wherein the first current path further comprises:
   a second self-powered operational amplifier; and
   a second IGFET having a source coupled to a terminal of the second self-powered operational amplifier and a drain coupled to the first anode;
   wherein the second self-powered operational amplifier is configured to introduce a current into the first current path that is approximately equal to a current introduced into the second current path by the self-powered operational amplifier in the second current path.

12. The current supply circuit of claim 10, wherein the first current path and the second current path each further comprise a capacitor configured to filter a respective current signal applied to the first anode and second anodes, respectively.

13. The current supply circuit of claim 10, wherein the second current path further comprises a fourth resistor having a first end coupled to the second end of the third resistor and a second end coupled to the source of the IGFET in the second current path.

14. The current supply circuit of claim 10, wherein the current supply circuit further comprises a low voltage source coupled to the high voltage power supply, the low voltage source configured to provide a low voltage signal to a gate of the IGFET in the second current path; wherein the low voltage signal is derived from the high voltage signal provided by the high voltage power supply.

15. The current supply circuit of claim 14, wherein the low voltage source includes a zener diode.

16. A method of balancing current through two legs of a ring laser gyroscope (RLG) block, the method comprising:
   generating a high voltage signal;
   providing a first current based on the high voltage signal in a first current path;
   providing a second current based on the high voltage signal in a second current path;
   adjusting the second current to mirror the first current with a self-powered operational amplifier in the second current path that is configured to operate based on power derived only from the high voltage signal used to provide the first current and the second current;
   delivering the first current to a first anode of the RLG block; and
   delivering the adjusted second current to a second anode of the RLG block.

17. The method of claim 16, wherein providing the first current further comprises filtering the first current prior to delivering the first current to the first anode; and
   wherein providing the second current further comprises filtering the second current prior to delivering the second current to the second anode.

18. The method of claim 16, further comprising passing the first current through a second self-powered operational amplifier to introduce a current into the first current path that is approximately equal to a current introduced into the second current path by the self-powered operational amplifier in the second current path.

19. The method of claim 16, wherein providing the second current further comprises boosting the second current in the second current path.

20. The method of claim 16, wherein adjusting the second current further comprises:
   limiting a voltage potential across voltage supply terminals of the operational amplifier with an insulated-gate field effect transistor having a source coupled to one of the voltage supply terminals and a gate coupled to a low voltage source.

* * * * *